(12) United States Patent
Yamaguchi et al.

(10) Patent No.: US 6,958,191 B2
(45) Date of Patent: Oct. 25, 2005

(54) LENS WITH STAIN RESISTANT SURFACE LAYER

(75) Inventors: Koichi Yamaguchi, Takasaki (JP); Hirofumi Kishita, Takasaki (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 50 days.

(21) Appl. No.: 10/649,875

(22) Filed: Aug. 28, 2003

(65) Prior Publication Data

US 2004/0047047 A1 Mar. 11, 2004

(30) Foreign Application Priority Data

Aug. 29, 2002 (JP) ........................................ 2002-250585

(51) Int. Cl.⁷ ................................................. B32B 9/04
(52) U.S. Cl. ........................ 428/447; 427/387; 427/167; 427/294; 351/159; 351/160 R; 351/166
(58) Field of Search .................. 528/401, 10; 428/447; 351/159, 160 R, 166; 427/387, 167, 294

(56) References Cited

U.S. PATENT DOCUMENTS 5,763,061 A * 6/1998 Ochiai et al. ............... 428/215
6,277,485 B1 * 8/2001 Invie et al. .................. 428/336

\* cited by examiner

*Primary Examiner*—Randy Gulakowski
*Assistant Examiner*—Christopher Keehan
(74) *Attorney, Agent, or Firm*—Millen White Zelano Branigan, P.C.

(57) ABSTRACT

A lens including a lens substrate, a surface layer, and a backing member provided beneath the surface layer, in which the backing member may be either the same as the lens substrate or a separate layer from the lens substrate, and wherein the surface layer includes a hydrolysis-condensation product of a perfluoropolyether modified silane with a hydrolysable functional group or a halogen atom X at both terminals, represented by a general formula (1) shown below:

(1)

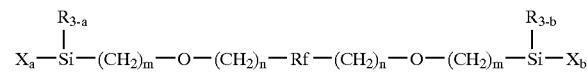

(wherein, Rf is a bivalent group with a straight chain perfluoropolyether structure containing no branching, which incorporates a unit represented by a formula —$(C_kF_{2k}O)$— (wherein, k represents an integer from 1 to 6)) is resistant to the adhesion of contaminants to the surface thereof, can be easily wiped to remove any adhered contaminants, provides a slippery surface that is difficult to scratch, and moreover displays excellent durability and is capable of retaining the above properties over extended periods.

12 Claims, No Drawings

LENS WITH STAIN RESISTANT SURFACE LAYER

BACKGROUND OF THE INVENTION

1. Field of the Invention

The present invention relates to a lens such as a spectacle lens, a camera lens or a magnifying lens with a surface layer that displays excellent stain resistance and excellent wipeability of stains such as hand grime and fingerprints.

2. Description of the Prior Art

Lenses, and particularly those lenses that are frequently handled, are prone to stain adhesion arising from hand grime, fingerprints, skin oils, sweat, saliva, and cosmetics such as hair setting products and the like, and the complete removal of such stains by careful wiping takes considerable time.

Furthermore, an anti-reflective film is typically provided on the surface of spectacle lenses and camera lenses, and this anti-reflective film is also prone to stain adhesion arising from hand grime, fingerprints, skin oils, sweat, saliva, and cosmetics such as hair setting products and the like. Moreover, adhesion of these types of stains can alter the surface reflectance, meaning the stains are more conspicuous than those on a simple transparent plate, and removal of the stains by wiping is also difficult. A solution to these problems has been keenly sought.

Conventional examples of optical products such as lenses with anti-reflective properties that offer improved contamination resistance include products comprising a substrate on which is formed an anti-reflective layer formed from either a single layer, or a plurality of layers, of an inorganic material comprising silicon dioxide as a primary component, formed by a PVD (Physical Vapor Deposition) method such as vacuum deposition, ion plating or sputtering, in which a cured layer of an organic polysiloxane-based polymer or a polymer containing perfluoroalkyl groups is provided on the surface of the anti-reflective layer (Japanese Post-Examination Patent publication (kokoku) No. 6-5324(JP6-5324B)). However, if contamination such as hand grime or fingerprints adhere to this type of cured layer, removal of the contamination by wiping with tissue paper or the like is difficult, and the wiping action tends to simply spread the contamination out in a thin film. In addition, over vigorous rubbing can cause scratching of the anti-reflective film, meaning contaminants cannot be satisfactorily wiped off.

Furthermore, compounds containing perfluoropolyether groups typically have extremely small surface energies, and consequently display good water and oil repellency, chemical resistance, lubrication, mold releasing properties, and stain resistance. These properties are widely utilized industrially in products such as water and oil repellent stain prevention agents for paper and fiber, lubricants for magnetic recording media, oil retaining agents for high precision equipment, mold releasing agents, cosmetics, and protective films and the like. However, the properties described above mean that the compounds also display very poor adhesion and bonding to other materials, and conventional perfluoropolyether group containing compounds, even if they are able to be applied to a substrate surface, are unable to form films or bind strongly.

On the other hand, the use of silane coupling agents to achieve bonding between the surface of a substrate such as glass or cloth and an organic compound, is well known. Silane coupling agents comprise an organic functional group and a reactive silyl group (usually an alkoxysilyl group) within a single molecule. For example, silane coupling agents containing alkoxysilyl groups form polysiloxane structures that function as covering films by undergoing a hydrolysis reaction and a condensation reaction with moisture in the air. At the same time, the aforementioned organic functional groups, together with the aforementioned reactive silyl groups, bond chemically and physically to the surface of the substrate such as glass or metal, forming a strong film that displays good durability. Utilizing these properties, silane coupling agents are widely used in surface coating agents for a variety of substrates.

An example of a surface treatment agent that combines the characteristics of the aforementioned perfluoropolyether group containing compounds and silane coupling agents, thereby providing a surface treatment agent that forms a strongly bonded film on a substrate surface, and also displays superior water and oil repellency, stain resistance, chemical resistance, lubrication, and mold releasing properties has been reported in Japanese Laid-open publication (kokai) No. 9-258003 (JP9-258003A), which discloses a lens with a stain resistant layer that utilizes a fluorine containing silane compound represented by a formula (2) shown below:

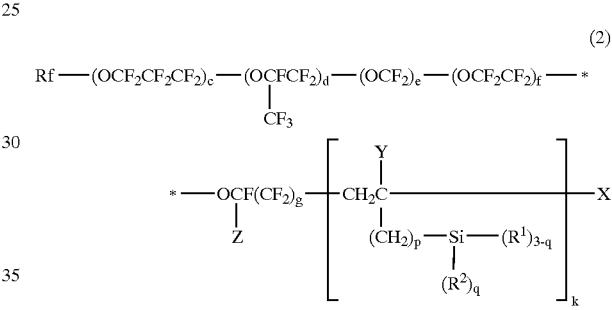

(2)

(wherein, Rf is a straight chain or branched chain perfluoroalkyl group of 1 to 16 carbon atoms, X is an iodine atom or a hydrogen atom, Y is a hydrogen atom or a lower alkyl group, Z is a fluorine atom or a trifluoromethyl group, $R^1$ is a hydrolysable group, $R^2$ is a hydrogen atom or an inactive monovalent organic group, c, d, e and f are each integers from 0 to 200, g is either 0 or 1, p and q are each integers from 0 to 2, and k is an integer from 1 to 10).

However, although fluorine containing silane compounds represented by the above formula (2) contain a comparatively large proportion of hydrolysable groups within each molecule, these hydrolysable groups exist only at one terminal of the molecular chain, and consequently the adhesion of these compounds to substrates is not entirely satisfactory, leading to durability problems, and when the compounds are used as surface treatment agents for lenses, the desired properties cannot be maintained over long periods, making them not particularly suitable.

(Patent applications for inventions pertaining to anti-reflective filters using the perfluoropolyether modified silane disclosed in a first aspect of the present invention have already been submitted by the applicant of the present invention, in Japanese Patent application No. 2001-310247 and Japanese Patent application No. 2001-378382.

SUMMARY OF THE INVENTION

An object of the present invention is the development of a lens with a stain resistant surface layer, which displays excellent water and oil repellency, is resistant to the adhesion of contaminants such as hand grime, fingerprints, skin oils, sweat, saliva, and cosmetics such as hair setting products, can be easily wiped with tissue paper or the like to remove any adhered stains such as hand grime or fingerprints, provides a slippery surface that can be wiped without scratching the surface, and moreover displays excellent durability and is capable of retaining the above properties of water and oil repellency, stain resistance, stain wipeability and scratch resistance over extended periods.

In order to achieve the above object, the present invention provides a lens comprising a lens substrate, a surface layer, and a backing member provided beneath said surface layer, in which said backing member is either identical to said lens substrate, or a separate layer from said lens substrate, wherein said surface layer comprises a hydrolysis-condensation product of a perfluoropolyether modified silane represented by a general formula (1) shown below:

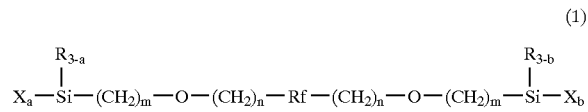

(1)

wherein, Rf is a bivalent group comprising a straight chain perfluoropolyether structure containing no branching and comprising a unit represented by a formula —($C_kF_{2k}O$)— wherein, k represents an integer from 1 to 6, each R represents, independently, a monovalent hydrocarbon group of 1 to 8 carbon atoms, each X represents, independently, a hydrolysable group or a halogen atom, each n represents, independently, an integer from 0 to 2, each m represents, independently, an integer from 1 to 5, and each a and b represents, independently, 2 or 3.

DETAILED DESCRIPTION OF THE PREFERRED EMBODIMENTS

As follows is a more detailed description of the present invention.

[Lens Substrate]

There are no particular restrictions on the material used for the lens substrate, which may be any material that is suitable for producing the desired lens function. In those cases in which an anti-reflective film is formed on the lens substrate using a liquid coating method such as that described below, substrates formed from glass or plastic are particularly ideal.

In those cases in which the lens substrate is formed using a plastic, a variety of different plastics can be used. Examples of suitable plastics include acrylic-based resins, diethylene glycol bisallyl carbonate resins, polycarbonate resins, polyester-based resins such as polyethylene terephthalate, unsaturated polyesters, acetate-based resins such as triacetyl cellulose, styrene-based resins, and vinyl chloride-based resins.

Furthermore, there are no particular restrictions on the shape of the lens substrate, and any shape suitable for use as a spectacle or camera lens can be used.

[Surface Layer Forming Material]

In a lens of the present invention, the surface layer described above comprises a hydrolysis-condensation product of a perfluoropolyether modified silane represented by a general formula (1) shown below:

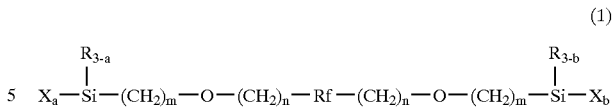

(1)

(wherein, Rf, R, X, n, m, a, and b are as described above). The hydrolysis-condensation product is a condensation curing product with a three dimensional structure generated by a hydrolysis and codensation reaction of the X.

As described above, the Rf group is a bivalent group with a straight chain perfluoropolyether structure containing no branching, which incorporates a unit represented by the formula —($C_kF_{2k}O$)— (wherein, k represents an integer from 1 to 6, and preferably an integer from 1 to 4). If each n in the above general formula (1) is 0, then the terminals of the Rf group that bond to the oxygen atoms (O) in the general formula (1) must not be oxygen atoms.

Suitable examples of the Rf group include groups represented by the general formulas shown below, although the present invention is not restricted to these structures.

(wherein, l represents an integer of 1 or greater, and preferably from 1 to 50, and even more preferably from 10 to 40)

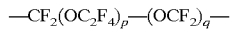

(wherein, p and q each represent an integer of 1 or greater, and preferably from 1 to 50, and even more preferably from 10 to 40, the sum of p+q is an integer from 10 to 100, and preferably from 20 to 90, and even more preferably from 40 to 80, and the repeating units represented by ($OC_2F_4$) and ($OCF_2$) in the general formula are arranged at random).

In those cases in which X is a hydrolysable group, suitable examples of the group include alkoxy groups such as methoxy groups, ethoxy groups, propoxy groups, and butoxy groups; alkoxyalkoxy groups such as methoxymethoxy groups, methoxyethoxy groups, and ethoxyethoxy groups; alkenyloxy groups such as allyloxy groups, and isopropenoxy groups; acyloxy groups such as acetoxy groups, propionyloxy groups, butylcarbonyloxy groups, and benzoyloxy groups; ketoxime groups such as dimethylketoxime groups, methylethylketoxime groups, diethylketoxime groups, cyclopentanoxime groups, and cyclohexanoxime groups; amino groups such as N-methylamino groups, N-ethylamino groups, N-propylamino groups, N-butylamino groups, N,N-dimethylamino groups, N,N-diethylamino groups, and N-cyclohexylamino groups; amide groups such as N-methylacetamide groups, N-ethylacetamide groups and N-methylbenzamide groups; and aminoxy groups such as N,N-dimethylaminoxy groups and N,N-diethylaminoxy groups.

Furthermore, in those cases in which X is a halogen atom, suitable examples of X include chlorine atoms, bromine atoms, and iodine atoms.

Of the above X, methoxy groups, ethoxy groups, isopropenoxy groups and chlorine atoms are preferred.

The group R described above is a monovalent hydrocarbon group of 1 to 8 carbon atoms, and preferably from 1 to 3 carbon atoms, and suitable examples include alkyl groups such as methyl groups, ethyl groups, propyl groups, butyl groups, pentyl groups, hexyl groups, heptyl groups, and octyl groups; cycloalkyl groups such as cyclopentyl groups and cyclohexyl groups; aryl groups such as phenyl groups, tolyl groups, and xylyl groups; aralkyl groups such as benzyl groups and phenethyl groups; and alkenyl groups such as vinyl groups, allyl groups, butenyl groups, pentenyl groups and hexenyl groups. Of these, methyl groups are preferred.

n is an integer from 0 to 2, and is preferably 1. Furthermore, m is an integer from 1 to 5, and is preferably 3.

a and b each represent either 2 or 3, and from the viewpoints of hydrolysis and condensation reactivity, and adhesion of the film, a value of 3 is preferred.

In addition, there are no particular restrictions on the molecular weight of the perfluoropolyether modified silane, although from the viewpoints of stability and ease of handling, the number average molecular weight is preferably within a range from 500 to 20,000, and even more preferably from 1000 to 10,000.

Specific examples of the aforementioned perfluoropolyether modified silane include the structural formulas shown below, although the present invention is not restricted to the structures shown.

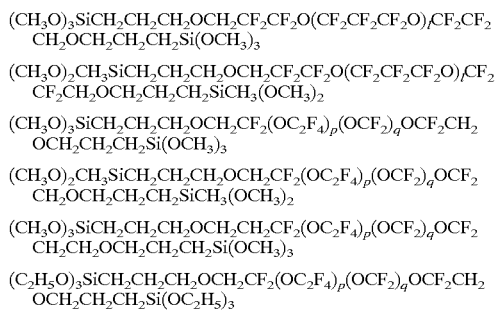

$(CH_3O)_3SiCH_2CH_2CH_2OCH_2CF_2CF_2O(CF_2CF_2CF_2O)_lCF_2CF_2$
$CH_2OCH_2CH_2CH_2Si(OCH_3)_3$ $(CH_3O)_2CH_3SiCH_2CH_2CH_2OCH_2CF_2CF_2O(CF_2CF_2CF_2O)_lCF_2$
$CF_2CH_2OCH_2CH_2CH_2SiCH_3(OCH_3)_2$ $(CH_3O)_3SiCH_2CH_2CH_2OCH_2CF_2(OC_2F_4)_p(OCF_2)_qOCF_2CH_2$
$OCH_2CH_2CH_2Si(OCH_3)_3$ $(CH_3O)_2CH_3SiCH_2CH_2CH_2OCH_2CF_2(OC_2F_4)_p(OCF_2)_qOCF_2$
$CH_2OCH_2CH_2CH_2SiCH_3(OCH_3)_2$ $(CH_3O)_3SiCH_2CH_2OCH_2CH_2CF_2(OC_2F_4)_p(OCF_2)_qOCF_2$
$CH_2CH_2OCH_2CH_2Si(OCH_3)_3$ $(C_2H_5O)_3SiCH_2CH_2CH_2OCH_2CF_2(OC_2F_4)_p(OCF_2)_qOCF_2CH_2$
$OCH_2CH_2CH_2Si(OC_2H_5)_3$ (wherein in the above formulas, l is an integer from 1 to 50, p is an integer from 1 to 50, q is an integer from 1 to 50, the sum of p+q is an integer from 10 to 100, and the arrangement of the repeating units within the parentheses ( ) in the bottom four formulas is random.)

These structures can be used singularly, or in combinations of two or more compounds.

Furthermore depending on the situation, a partial hydrolysis-condensation product of an aforementioned perfluoropolyether modified silane may also be added.

Because a surface layer comprising a hydrolysis-condensation product of an aforementioned perfluoropolyether modified silane has a small surface energy, contaminants such as hand grime, fingerprints, skin oils, sweat, saliva, and cosmetics such as hair setting products and the like are unlikely to adhere to the surface layer, and even if such contaminants do adhere to the surface, they can be easily wiped off and removed. Furthermore, because the surface of the surface layer displays superior slipperiness, deterioration in the stain resistance of the layer arising from excessive rubbing during wiping of the layer can be prevented, and in those cases in which the surface layer is formed on top of an anti-reflective layer as described below, the surface of the anti-reflective layer is far less likely to be subjected to scratching, enabling the prevention of a phenomenon in which the anti-reflective layer can separate as a result of scratching. In addition, because the perfluoropolyether modified silane has a hydrolysable functional group or a halogen atom at both terminals, the adhesion of the surface layer to the backing member is excellent, enabling the provision of a surface layer that is able to retain the type of stain resistance properties described above over extended periods.

[Method of Forming the Surface Layer]

The surface layer incorporating a hydrolysis-condensation product of an aforementioned perfluoropolyether modified silane (hereafter also abbreviated as a "modified silane") can be formed by applying a coating agent containing the modified silane to the surface of a backing member described above, and then performing hydrolysis and condensation, or by vacuum-depositing the modified silane directly onto the backing member and then performing hydrolysis and condensation.

In those cases in which a coating agent containing the modified silane is applied, if the modified silane is a fluid, it may be used, as is, as the coating agent, although the modified silane may also be diluted with a suitable solvent if required. If a solvent is used, then either a single solvent or a mixture of two or more solvents can be used, and in either case, the solvent should preferably be capable of dissolving the modified silane to form a homogeneous solution.

Examples of suitable solvents include fluorine modified aliphatic hydrocarbon-based solvents such as perfluoroheptane and perfluorooctane; fluorine modified aromatic hydrocarbon-based solvents such as 1,3-di(trifluoromethyl)benzene and trifluoromethylbenzene; fluorine modified ether-based solvents such as methyl perfluorobutyl ether and perfluoro(2-butyltetrahydrofuran); fluorine modified alkylamine-based solvents such as perfluorotributylamine and perfluorotripentylamine; hydrocarbon-based solvents such as petroleum benzine, mineral spirit, toluene and xylene; and ketone-based solvents such as acetone, methyl ethyl ketone, and methyl isobutyl ketone. These solvents can be used singularly, or in combinations of two or more solvents. Of the above solvents, fluorine modified solvents are preferred in terms of solubility of the modified silane and wetting of the target surface, and 1,3-di(trifluoromethyl)benzene, perfluoro(2-butyltetrahydrofuran), and perfluorotributylamine are particularly preferred.

Examples of suitable application methods include known methods such as brush application, dipping, spraying or spin coating. The optimum process temperature will vary depending on the application process used, and for example in the case of brush application or dipping, the application is preferably conducted at a temperature within a range from room temperature to 120° C. The application process is preferably conducted under humidifying conditions in order to promote the hydrolysis and condensation reaction, and because the specific process conditions will vary depending on the type of modified silane compound used and the presence of any additives, these conditions should preferably be adjusted to produce the optimum result.

The film formed by the application process described above (if a solvent is used, then the film following evaporation of the solvent) is hydrolyzed by moisture in the atmosphere and forms a surface layer according to the present invention. If necessary, a catalyst for accelerating the hydrolysis of the hydrolysable functional group or a halogen atom may also be added to the coating agent. Examples of suitable catalysts include organotin compounds such as dibutyltin dimethoxide and dibutyltin dilaurate; titanium containing organic compounds such as tetra-n-butyl titanate; organic acids such as acetic acid and methanesulfonic acid; and inorganic acids such as sulfuric acid. These catalysts can be used singularly, or in combinations of two or more compounds. Of the above catalysts, acetic acid, tetra-n-butyl titanate, and dibutyltin dilaurate are particularly preferred. If a catalyst is added, then there is no particular restrictions on the quantity of the catalyst, and an effective catalytic quantity is adequate, although typically the quantity of the catalyst is within a range from 0.01 to 5 parts by weight, and preferably from 0.1 to 1 parts by weight per 100 parts by weight of the aforementioned modified silane.

A layer of the modified silane used in the present invention can also be formed directly on the surface of the lens substrate or the like using a dry thin film formation method such as vacuum deposition or sputtering. A layer of a modified silane formed using one of these methods is subsequently cured through a hydrolysis and condensation reaction with moisture in the atmosphere, thereby forming a stain resistant surface layer.

The film thickness of the stain resistant surface layer formed by either of the above methods can be set in accordance with the type of substrate and the associated optical characteristics, although the film thickness is typically within a range from 0.1 nm to 5 μm, and preferably from 1 to 100 nm.

[Inorganic Anti-Reflective Layer]

A lens of the present invention may also comprise, as a backing member, a layer that is different from the lens substrate and is disposed between the lens substrate and the surface layer. For example, a lens may comprise an inorganic anti-reflective layer disposed between the lens substrate and the surface layer.

Formation of this anti-reflective inorganic layer utilizes an inorganic material formed from an inorganic oxide, an inorganic halide, or a composite material thereof. Specific examples of this inorganic material include inorganic oxides such as $SiO_2$, $ZrO_2$, $Al_2O_3$, $Y_2O_3$, and $TiO_2$; and inorganic halides such as $MgF_2$, $BaF_2$, $CaF_2$, $LaF_2$, LiF, NaF, $SrF_2$, $Na_3AlF_6$, and $Na_5Al_3F_{14}$. These inorganic materials can be used singularly, or in combinations of two or more materials.

Formation of the inorganic anti-reflective layer can be conducted using any suitable thin film formation method, including any of the various PVD (Physical Vapor Deposition) methods such as vacuum deposition, sputtering and ion plating; or any of the various fluid application methods such as spin coating, immersion coating, curtain flow coating, roll coating, spray coating and flow coating.

The PVD methods described above are ideally suited to the aforementioned inorganic oxides such as $SiO_2$ and the inorganic halides such as $MgF_2$. Particularly in those cases where an anti-reflective layer with a multi-layered structure is formed, then from the viewpoints of increasing hardness and ensuring good adhesion with the surface layer, the uppermost layer of the anti-reflective layer is preferably formed from a layer comprising $SiO_2$ as a primary component, using a PVD method.

From the viewpoint of the anti-reflective effect, the anti-reflective layer is preferably a multi-layered structure, and a multi-layered structure containing either 1, or 2 or more inner layers with refractive indexes greater than that of the $SiO_2$-based inorganic layer of the outermost layer is preferred. In such a case, the thickness and the refractive index of each of the layers can be set in accordance with the conventional technology as described in "Optics of Thin Films", by A. Vasicek (pp. 159 to 283, published by North Holland Publishing Company, Amsterdam (1960)).

Furthermore, in those cases in which the lens substrate is glass, incorporation of a low refractive index material such as $MgF_2$, $CaF_2$ or $Na_5Al_3F_{14}$ in the anti-reflective layer produces a better anti-reflective effect, and is consequently preferred. If the lens substrate is plastic, incorporation of a material with a comparatively low refractive index and a high hardness value such as $SiO_2$ in the anti-reflective layer is preferred in terms of factors such as durability.

[Other Layers]

A lens of the present invention may also comprise a hard coat layer on top of the lens substrate. In such cases, the lens adopts a configuration in which the hard coat layer is provided either between the lens substrate and the surface layer, or between the lens substrate and the anti-reflective layer.

The hard coat layer can also be formed using conventional materials. Of the available materials, hard coat layers formed from the cured products of organosilicon compounds, and particularly organosilicon compounds represented by a general formula (3) shown below, or partial hydrolysis-condensation products thereof, are preferred.

$$R^3{}_c R^4{}_d Si(OR^5)_{4-c-d} \qquad (3)$$

(wherein, $R^3$ and $R^4$ each represent an unsubstituted or substituted monovalent hydrocarbon group of 1 to 8 carbon atoms, $R^5$ represents a monovalent organic group, and c and d each represent either 0 or 1). In the above formula, examples of the groups $R^3$ and $R^4$ include alkyl groups such as methyl groups and ethyl groups; alkenyl groups such as vinyl groups and isopropenyl groups; aryl groups such as phenyl groups; and groups in which at least 1 hydrogen atom from one of the above groups is substituted with a halogen atom such as a chlorine atom or a bromine atom, or an epoxy group, a glycidoxy group, an amino group, a mercapto group, a methacryloyloxy group or a cyano group. Examples of the group $R^5$ within the formula include alkyl groups of 1 to 8 carbon atoms such as methyl group, ethyl groups, propyl groups, butyl groups, pentyl groups, hexyl groups, heptyl groups and octyl groups; acyl groups such as acetyl groups and benzoyl groups; and aryl groups such as phenyl groups.

Examples of organosilicon compounds represented by the general formula (3) above include methyltrimethoxysilane, vinyltrimethoxysilane, γ-chloropropyltriethoxysilane, γ-methacryloyloxypropyltrimethoxysilane, γ-glycidoxypropyltrimethoxysilane, γ-aminopropyltriethoxysilane, methyl silicate, and ethyl silicate. These compounds can be used singularly, or in combinations of two or more compounds.

The hard coat layer is formed using a coating liquid comprising an aforementioned organosilicon compound or a partial hydrolysis-condensation product thereof, an additional solvent if required, and a suitable quantity of a curing catalyst, and the coating liquid is applied using an application method such as immersion, brush application, spin coating, spraying or flow coating, and then dried either at room temperature or under heating (preferably at a temperature of no more than 120° C.). Following drying, the layer may also be subjected to further heat treatment (preferably at a temperature of no more than 120° C.) to cure the above component.

Fine particles of a metal oxide or the like such as silica or alumina, with an average particle diameter of 0.5 to 5 μm, can also be incorporated within the hard coat layer, using a sol-gel method for example. Furthermore, the surface of the hard coat layer can also be subjected to etching using a method such as buffing, corona discharge or ion etching to generate a center line average height of 0.01 to 0.5 μm, thereby imparting the surface with an antiglare function.

In addition, the lens substrate may also be provided with other suitable coating layers, either instead of the aforementioned hard coat layer, or in addition to the hard coat layer, or alternatively subjected to various surface treatments, for the purposes of improving the adhesion of the anti-reflective layer, or improving other properties such as the hardness, chemical resistance, durability or dye affinity.

In those cases in which the lens substrate is plastic, a variety of materials can be used for improving the surface hardness, including the materials disclosed in Japanese Post-Examination Patent publication (kokoku) No. 50-28092 (JP50-28092B), Japanese Post-Examination Patent publication (kokoku) No. 50-28446 (JP50-28446B), Japanese Post-Examination Patent publication (kokoku) No. 50-39449 (JP50-39449B), Japanese Post-Examination Patent publication (kokoku) No. 51-24368 (JP51-24368B), Japanese Post-Examination Patent publication (kokoku) No. 57-2735 (JP57-2735B), Japanese Laid-open publication (kokai) No. 52-112698 (JP52-112698A). Furthermore, coating methods in which a metal such as titanium, aluminum or tin, or a metal oxide such as $SiO_2$ is applied to the surface of the substrate, or the use of acrylic-based cross linked polymers formed from cross linked polymers of pentaerythritol (meth)acrylate or the like, are also effective in improving the hardness of the substrate.

EXAMPLES

As follows is a more specific description of the present invention using a series of examples and comparative examples, although the present invention is in no way restricted to the examples presented below. In the following examples, the units "parts" refer to parts by weight.

Example 1

An ethanol solution comprising 135 parts by weight of silica sol, 129 parts by weight of a partial hydrolysis-condensation product of γ-glycidoxypropyltriethoxysilane, and 70 parts by weight of a partial hydrolysis-condensation product of γ-chloropropyltrimethoxysilane was applied to a polycarbonate resin substrate (diameter: 80 mm) of thickness 2 mm, and then cured to form a hard coat layer with a thickness of approximately 3 μm. Sputtering was then used to form a multi-layered anti-reflective layer on top of the hard coat layer, comprising 5 sequential layers in a sequence represented by $SiO_2$ layer, $TiO_2$ layer, $SiO_2$ layer, $TiO_2$ layer, $SiO_2$ layer, with the optical film thickness of each layer set to λ/4 (λ=540 nm).

Next, a coating solution was prepared by dissolving 0.2 g of a perfluoropolyether modified silane of a compound 1 described below in 99.8 g of perfluoro(2-butyltetrahydrofuran). This coating solution was applied to the surface of the above anti-reflective layer using a spin coating method, and was subsequently left to stand for 24 hours at 25° C. and 70% humidity to allow the solvent to evaporate and curing to occur, thereby forming a stain resistant surface layer with a thickness of approximately 5 nm. The evaluations (1) to (3) described below were then performed using test pieces on which the surface layer had been formed. The results of the evaluations are shown in Table 1.

$OCH_2CH_2CH_2Si(OCH_3)_3$               Compound 1

(wherein, p=22, q=22, and the repeating units appended with p or q are arranged at random)

[Evaluation Methods]

(1) Evaluation of Surface Characteristics a. Drop Angle (Degrees)

Using a contact angle meter (model CA-A, manufactured by Kyowa Interface Science Co., Ltd.), the drop angle was measured for an oleic acid droplet of diameter 2 mm on the surface of the test piece. The measurement was repeated at 5 different locations on the surface of the test piece, and the average result was reported.

b. Peel Strength

A polyester adhesive tape (No. 31B, width 19 mm, manufactured by Nitto Denko Corporation) was bonded to the surface of a test piece with one end of the tape left unbonded. This unbonded end section was then secured to a tensile tester and pulled at an angle of 180° using a peel speed of 300 mm/min., and the force required (units: N/19 mm) to peel the tape away from the test piece was measured.

(2) Evaluation of Surface Layer Durability

A test piece as described above was immersed for 5 minutes in a fluorine-based solvent AK-225 (trade name, manufactured by Asahi Glass Co., Ltd.). The test piece was then removed and dried, and the drop angle and the peel strength were measured in the same manner as described above in sections a and b. The results were compared with the values obtained prior to the immersion in solvent to evaluate the durability of the surface layer.

(3) Evaluation of Stain Resistance

An index finger was pressed against an aforementioned test piece for 5 seconds to generate a fingerprint, and the ease with which the fingerprint could be removed by wiping with a dry cloth was evaluated. The evaluation standards used are shown below, and the average evaluation of 5 testers was reported as the final evaluation of the stain resistance of the surface layer.

Evaluation Standards for Fingerprint Wipeability

If the fingerprint could be removed with a light wiping action, the wipeability was evaluated as good, and was recorded using the symbol O.

If the fingerprint was difficult to wipe off, but was eventually removed leaving no trace of the fingerprint, the wipeability was evaluated as fair, and was recorded using the symbol Δ.

If the fingerprint was difficult to wipe off and left a mark on the surface, the wipeability was evaluated as poor, and was recorded using the symbol x.

Example 2

0.5 g of a solution formed by dissolving 20 g of the perfluoroalkylenepolyalkyleneether modified silane of the compound 1 used in the example 1 in 80 g of perfluoro(2-butyltetrahydrofuran) was impregnated into a circular cylindrical porous ceramic pellet of diameter 5 mm and height 3 mm, and the perfluoro(2-butyltetrahydrofuran) was then volatilized and removed by standing the pellet at 70° C. for 60 minutes. The pellet was placed on top of a molybdenum boat, which functions as a resistance heater, and then mounted inside a vacuum deposition apparatus HSV-3-3G (tradename, manufactured by Sato Vac Inc.). A polycarbonate resin substrate with an anti-reflective layer and the like formed thereon from the example 1 was also mounted inside the vacuum deposition apparatus. The inside of the vacuum deposition apparatus was then evacuated down to a vacuum of no more than $5×10^{-3}$ Torr, the aforementioned boat was heated to a temperature of at least 500° C., and vacuum deposition was conducted.

Using this procedure, a layer of the perfluoroalkylenepolyalkyleneether modified silane of the compound 1, with a thickness of approximately 4 nm, was formed on the surface of the anti-reflective layer. Subsequently, the test piece was left to stand for 24 hours in an atmosphere at 25° C. and 70% humidity to cure the layer and form a surface layer. This test piece was then evaluated in the same manner as the example 1. The results are shown in Table 1.

Comparative Examples 1 to 3

With the exception of replacing the compound 1 of the example 1 with the compounds 2 to 4 shown below, test pieces were prepared and evaluated in the same manner as the example 1. The results are shown in Table 1.

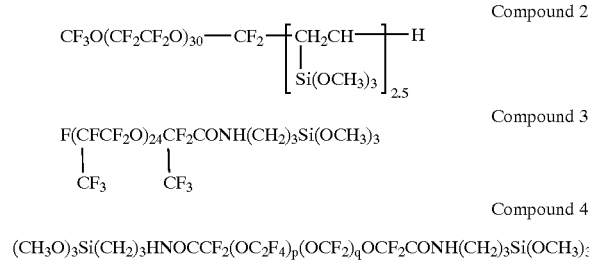

Compound 2

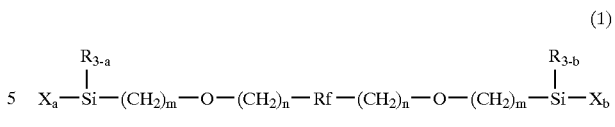

Compound 3

Compound 4

(CH₃O)₃Si(CH₂)₃HNOCCF₂(OC₂F₄)ₚ(OCF₂)qOCF₂CONH(CH₂)₃Si(OCH₃)₃

(wherein, p=22, q=22, and the repeating units appended with p or q are arranged at random).

TABLE 1

| | | Drop angle (degrees) | | Peel strength (N/19 mm) | | Finger-print wipe-ability |
|---|---|---|---|---|---|---|
| | | Prior to immersion | After immersion | Prior to immersion | After immersion | |
| Example 1 | Compound 1 | 1.8 | 1.8 | 0.12 | 0.14 | ○ |
| Example 2 | Compound 1 | 0.9 | 1.1 | 0.08 | 0.11 | ○ |
| Comparative Examples 1 to 3 | Compound 2 | 3.0 | 11.6 | 0.15 | 0.25 | ○ |
| | Compound 3 | 3.4 | 10.4 | 0.19 | 0.37 | Δ |
| | Compound 4 | 6.2 | 6.5 | 0.29 | 0.34 | Δ |

[Evaluations]

As is evident from the results in Table 1, the comparative examples 1 and 2, which used the compounds 2 and 3 with a methoxy group as the hydrolysable group at only one terminal, not only displayed inferior oil repellency when compared with the examples 1 and 2, but also showed a far greater deterioration in performance after immersion in solvent, indicating inferior durability. Furthermore the comparative example 3, which used the compound 4 with methoxy groups at both terminals and an internal amide linkage, displayed no particular durability problems, but produced inferior results to the examples 1 and 2 in terms of oil repellency, tape peeling strength and fingerprint wipeability.

From these results it is clear that a lens of the present invention, with a stain resistant surface layer, is resistant to the adhesion of contaminants such as hand grime, fingerprints and skin oils and the like, can be easily wiped to remove any adhered contaminants, and moreover displays excellent durability.

A lens with a stain resistant surface layer according to the present invention formed thereon is resistant to the adhesion of contaminants such as hand grime, fingerprints and skin oils and the like, can be easily wiped to remove any adhered contaminants, provides a slippery surface that is difficult to scratch, and moreover displays excellent durability and is capable of retaining the above properties over extended periods.

What is claimed is:

1. A lens comprising a lens substrate, a surface layer, and a backing member provided beneath the surface layer, wherein the backing member is either identical to the lens substrate, or a separate layer from the lens substrate, wherein the surface layer comprises a hydrolysis-condensation product of a perfluoropolyether modified silane represented by the formula (1) shown below:

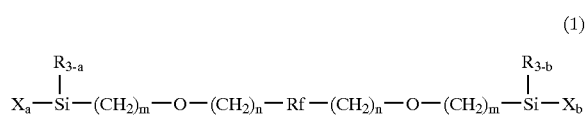

(1)

wherein, Rf is a bivalent group comprising a straight chain perfluoropolyether structure containing no branching and comprising a unit represented by a formula —($C_kF_{2k}O$)— wherein, k represents an integer of 1–6, each R represents, independently, a monovalent hydrocarbon group of 1–8 carbon atoms, each X represents, independently, a hydrolysable group or a halogen atom, each n represents, independently, an integer of 0–2, each m represents, independently, an integer of 1–5, and each of a and b represents, independently, 2 or 3 and the surface layer is formed by vacuum-depositing the perfluoropolyether modified silane directly onto the backing member, and subsequently performing hydrolysis and condensation.

2. The lens according to claim 1, wherein the Rf group in the formula (1) is a bivalent group comprising a perfluoropolyether structure represented by the formula shown below:

wherein, l represents an integer of 1 or greater.

3. The lens according to claim 1, wherein the Rf group in the formula (1) is a bivalent group comprising a perfluoropolyether structure represented by the formula shown below:

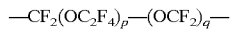

wherein, p and q each represent an integer of 1 or greater, a sum of p+q is an integer from 10–100, and the repeating units represented by ($OC_2F_4$) and ($OCF_2$) in the formula are arranged at random.

4. The lens according to claim 1, wherein each group X in the formula (1) represents, independently, a methoxy group, an ethoxy group, an isopropenoxy group or a chlorine atom.

5. The lens according to claim 1, wherein a thickness of the surface layer is within a range of 0.1 nm–5 μm.

6. The lens according to claim 1, wherein the backing member is different from the lens substrate, and is an inorganic anti-reflective layer.

7. A lens comprising a lens substrate, a surface layer, and a backing member provided beneath the surface layer, wherein the backing member is either identical to the lens substrate, or a separate layer from the lens substrate, wherein the surface layer comprises a hydrolysis-condensation product of a perfluoropolyether modified silane represented by the formula (1) shown below:

(1)

$$X_a-\underset{\underset{R_{3-a}}{|}}{Si}-(CH_2)_m-O-(CH_2)_n-Rf-(CH_2)_n-O-(CH_2)_m-\underset{\underset{R_{3-b}}{|}}{Si}-X_b$$

wherein, Rf is a bivalent group comprising a straight chain perfluoropolyether structure containing no branching and comprising a unit represented by a formula —($C_kF_{2k}O$)— wherein, k represents an integer of 1–6, each R represents, independently, a monovalent hydrocarbon group of 1–8 carbon atoms, each X represents, independently, a hydrolysable group or a halogen atom, each n represents, independently, an integer of 0–2, each m represents, independently, an integer of 1–5, and each of a and b represents, independently, 2 or 3, and the surface layer is formed by vacuum-depositing the perfluoropolyether modified silane directly onto the backing member.

8. The lens according to claim 1, wherein the backing member is identical to the lens substrate.

9. A process for producing a lens comprising vacuum-depositing a surface layer onto a lens substrate or a backing member on a lens substrate, wherein the surface layer comprises:

a hydrolysis-condensation product of a perfluoropolyether modified silane represented by the formula (1) shown below:

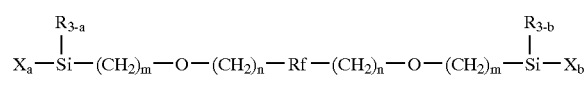

(1)

wherein, Rf is a bivalent group comprising a straight chain perfluoropolyether structure containing no branching and comprising a unit represented by a formula —$(C_kF_{2k}O)$— wherein, k represents an integer of 1–6, each R represents, independently, a monovalent hydrocarbon group of 1–8 carbon atoms, each X represents, independently, a hydrolysable group or a halogen atom, each n represents, independently, an integer of 0–2, each m represents, independently, an integer of 1–5 and each of a and b represents, independently, 2 or 3.

10. The process according to claim 9, further comprising subsequently performing hydrolysis and condensation.

11. The lens according to claim 1, wherein the perfluoropolyether modified silane is applied in the form of a vapor.

12. The process according to claim 9, wherein the perfluoropolyether modified silane is applied in the form of a vapor.

* * * * *